United States Patent
Seo

(10) Patent No.: US 7,123,438 B2
(45) Date of Patent: Oct. 17, 2006

(54) FRONT PANEL ASSEMBLY OF DISK DRIVE HAVING DOOR LOCKING MEANS AND DISK DRIVE INCORPORATING THE SAME

(75) Inventor: Seong-ko Seo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 650 days.

(21) Appl. No.: 10/609,367

(22) Filed: Jul. 1, 2003

(65) Prior Publication Data
US 2004/0004785 A1  Jan. 8, 2004

(30) Foreign Application Priority Data
Jul. 3, 2002  (KR) ............... 2002-38337

(51) Int. Cl.
*G11B 17/04* (2006.01)
(52) U.S. Cl. ................................. 360/97.01
(58) Field of Classification Search ............. 360/97.01, 360/99.02, 99.06; 720/601, 610
See application file for complete search history.

(56) References Cited

U.S. PATENT DOCUMENTS 4,965,685 A * 10/1990 Thompson et al. ...... 360/97.01
5,220,552 A * 6/1993 Yokoi et al. ................ 720/646
5,243,478 A * 9/1993 Kawakami et al. ....... 242/338.4
5,371,639 A * 12/1994 Bryer ........................ 360/96.5
6,212,147 B1 * 4/2001 Ishihara ...................... 720/612

FOREIGN PATENT DOCUMENTS

JP          9-297983       11/1997
KR       96003489 B1       3/1996

* cited by examiner

*Primary Examiner*—Angel Castro
(74) *Attorney, Agent, or Firm*—Staas & Halsey LLP

(57) ABSTRACT

A disk drive having a body including: a spindle motor for rotating a disk; a pickup unit for accessing the disk; a tray for accommodating the disk, which retracts and extends from the body; and a front panel assembly mounted on the body, which allows the tray to retract and extend. The front panel assembly has a front panel with an entrance, through which the tray retracts and extends, a door rotationally assembled with the front panel to open and close the entrance in connection with movements of the tray, an elastic member that provides an elastic force to the door in the direction of closing the entrance, a door locking apparatus that selectively allows and prevents the rotation of the door in connection with the movements of the tray. Accordingly, it is possible to prevent the door from opening while the tray is in a retracted state.

16 Claims, 4 Drawing Sheets

FRONT PANEL ASSEMBLY OF DISK DRIVE HAVING DOOR LOCKING MEANS AND DISK DRIVE INCORPORATING THE SAME

CROSS-REFERENCE TO RELATED APPLICATIONS

This application claims the priority of Korean Patent Application No. 2002-38337, filed on Jul. 3, 2002, in the Korean Intellectual Property Office, the disclosure of which is incorporated herein by reference.

BACKGROUND OF THE INVENTION

1. Field of the Invention

The present invention relates to a front panel assembly of a disk drive, and a disk drive incorporating the same. More particularly, the present invention relates to a front panel assembly of a disk drive having a door locking apparatus for selectively locking a door through which a tray comes in and out, and a disk drive incorporating the same.

2. Description of the Related Art

Typically, a disk drive is an apparatus for recording and/or reproducing information on and from an optical disk such as a compact disk (CD), a digital video disk (DVD), or the like. The disk drive has a tray for accommodating a disk, which is loaded in or unloaded from a body, and a front panel assembly having an entrance through which the tray retracts and extends, which is mounted in front of the body.

FIG. 1 is an exploded perspective view of a conventional front panel assembly of a disk drive, and FIG. 2 is a sectional view taken along line A–A' in FIG. 1. Referring to FIGS. 1 and 2, there is shown a body 110 of a disk drive, a tray 120, a front panel 130, a door 140, and a torsion spring 150. The tray 120 is assembled with the body 110 and retracts and extends in the directions of arrows B and C of FIG. 1. The front panel 130 is mounted in front of the body 110. The front panel 130 includes an entrance 131 through which the tray 120 comes in and out, support members 132 and 133 to support the door 140, and a fixing member 134, to which an arm 151 of the torsion spring 150 is fixed. The door 140 closes the entrance 131 to cover the inside of the body 110 while the tray 120 is loaded therein. Hinge arms 141 are provided at the left and right ends of the door 140. The hinge arms 141 are assembled with, and rotate in the support members 132 and 133. Further, a limit member 142 is provided at the right hinge arm 141. The torsion spring 150 is set around the right end of the hinge arm 141. One arm 151 of the spring 150 is fixed to the fixing member 134 of the front panel 130. The other arm 152 of the spring 150 provides an elastic force to the limit member 142 to rotate the door 140 in the direction of closing the door 140, i.e., in the direction of an arrow D in FIG. 1. When the door 140 is closed after the tray 120 is loaded in the body 110, the limit member 142 contacts the rear side of the front panel 130 and prevents the door 140 from excessively rotating in the direction of arrow D in FIG. 1.

With the structure as described above, while the tray 120 is in a retracted state, the door 140 is kept closed by the elastic force of the torsion spring 150. However, when the tray 120 slides out in the direction of the arrow B in FIG. 1, for example, to accommodate a disk, the front side 121 of the tray 120 contacts and pushes the door 140, and accordingly, the door 140 rotates in the direction of an arrow E in FIG. 2. Then, the tray 120 slides through the entrance 131. When the tray 120 retracts again in the direction of the arrow C in FIG. 1, the door 140 rotates in the direction of the arrow D in FIG. 1 by the elastic force of the torsion spring 150, and then the door 140 closes again.

These days, disk drives are manufactured to have higher rotational speeds for faster data transfer, as well as a higher capacity for larger data storage. The rotational speed of a disk drive became significantly faster from 1× in the early stage through 16× and 32× to a recent 52×. The rotational speed or rate of a disk reaches around 3,600 RPM (revolutions per minute) in a 16× disk drive, and around 12,000 RPM in a 52× disk drive. However, a disk may be broken in such fast rotational environments if there exists even a tiny crack on the disk, and pieces of such broken disk would fly away in every direction at a very high speed. If any piece of the broken disk came out of the body 110, a user could be critically harmed. The conventional disk drive as shown in FIGS. 1 and 2 has a problem, however, in that it cannot sufficiently shield or block such pieces of the broken disk which have significant kinetic energy, because the door 140 is simply closed by the elastic force of the spring 150.

SUMMARY OF THE INVENTION

To solve the above and/or other problems, it is an aspect of the present invention to provide a front panel assembly of a disk drive having a door locking apparatus that prevents a door from opening while the tray is in a retracted state, and a disk drive incorporating the same.

According to an aspect, there is provided a front panel assembly mounted on a body of a disk drive for reading and/or writing information by accessing a disk, which has a front panel with an entrance through which a tray for accommodating the disk extends and retracts, a door that is rotationally assembled with the front panel to open and close the entrance in connection with movements of the tray, an elastic member that provides an elastic force to the door in the direction of closing the entrance, and a door locking apparatus that selectively allows or prevents the rotation of the door in connection with the movements of the tray.

According to another aspect of the present invention, there is provided a disk drive having a body including a spindle motor for rotating a disk, a pickup unit for accessing the disk, and a tray for accommodating the disk, which retracts into and extends from the body; and a front panel assembly mounted in front of the body, which allows the tray to retract and extend, wherein the front panel assembly comprises a front panel having an entrance through which the tray retracts and extends, a door that is rotationally assembled with the front panel to open and close the entrance in connection with movements of the tray, an elastic member that provides an elastic force to the door in the direction of closing the entrance, and a door locking apparatus that selectively allows or prevents the rotation of the door in connection with the movements of the tray.

Furthermore, according to still another aspect of the present invention, the door locking apparatus has: a hook member provided on a first side of the door; and a locking lever mounted on the front panel, which includes an elastically deformable locking member that engages the hook member to prevent the door from opening while the tray is in a retracted state, and a contact member that when contacted by the tray during extension and retraction of the tray, causes the locking member to elastically deform so that the locking member is released from the hook member.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Figure 1:
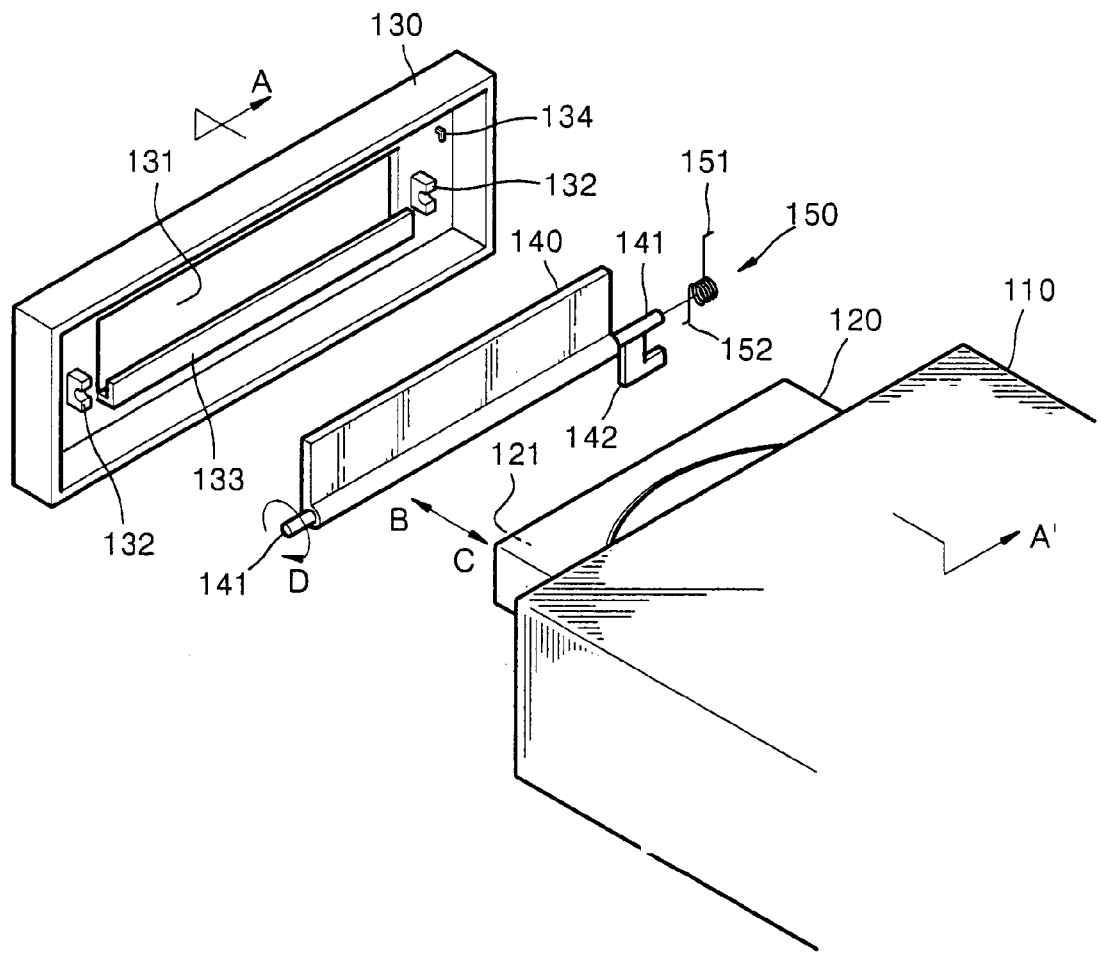
FIG. 1 is an exploded perspective view of a disk drive incorporating a conventional front panel assembly.
Figure 2:
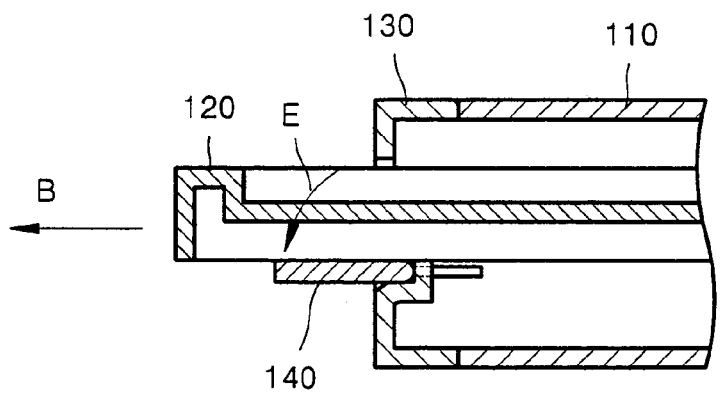
FIG. 2 is a sectional view taken along line A–A' of FIG. 1.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 3:
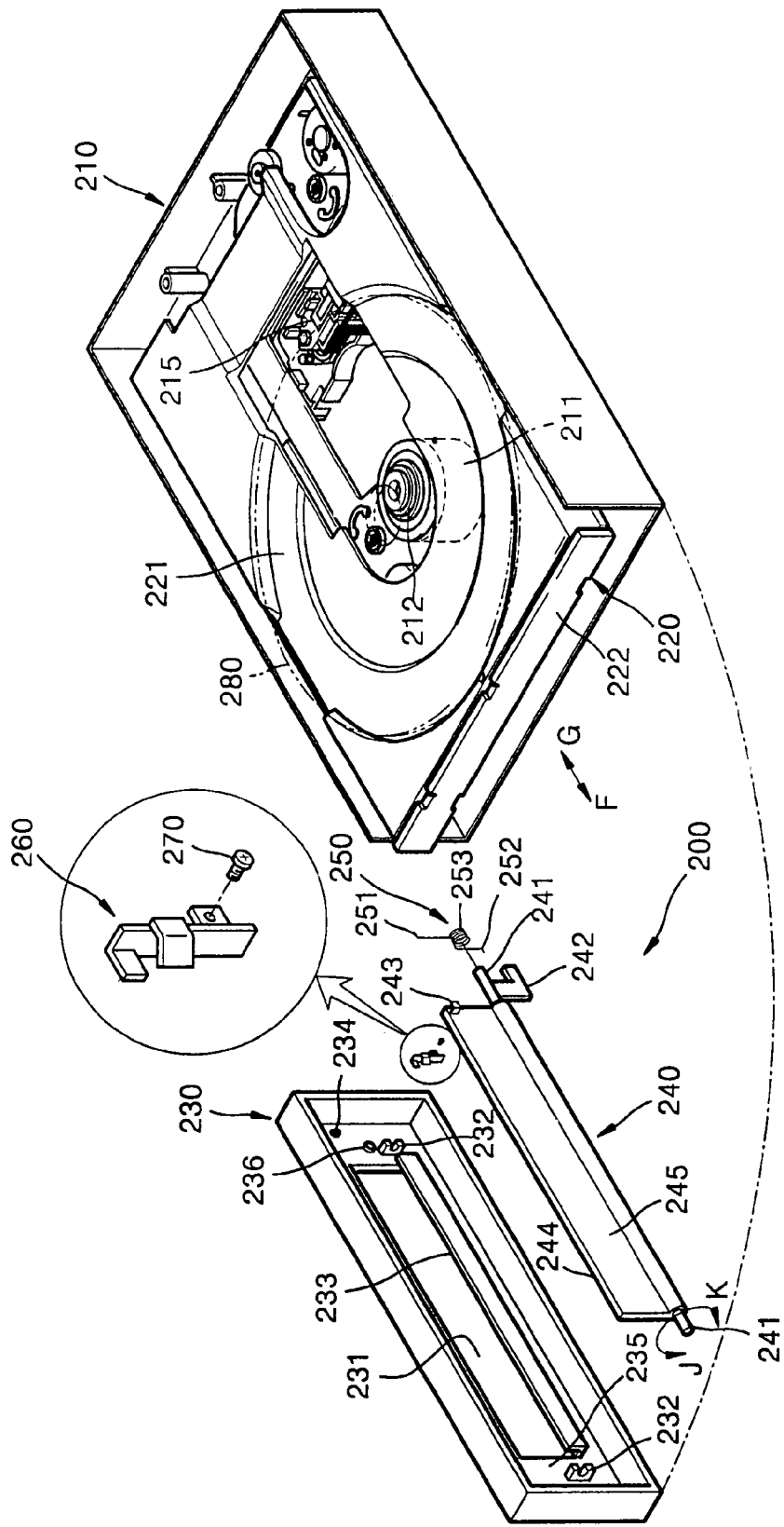
FIG. 3 is an exploded perspective view of a disk drive incorporating a front panel assembly according to an embodiment of the present invention.
Figure 4:
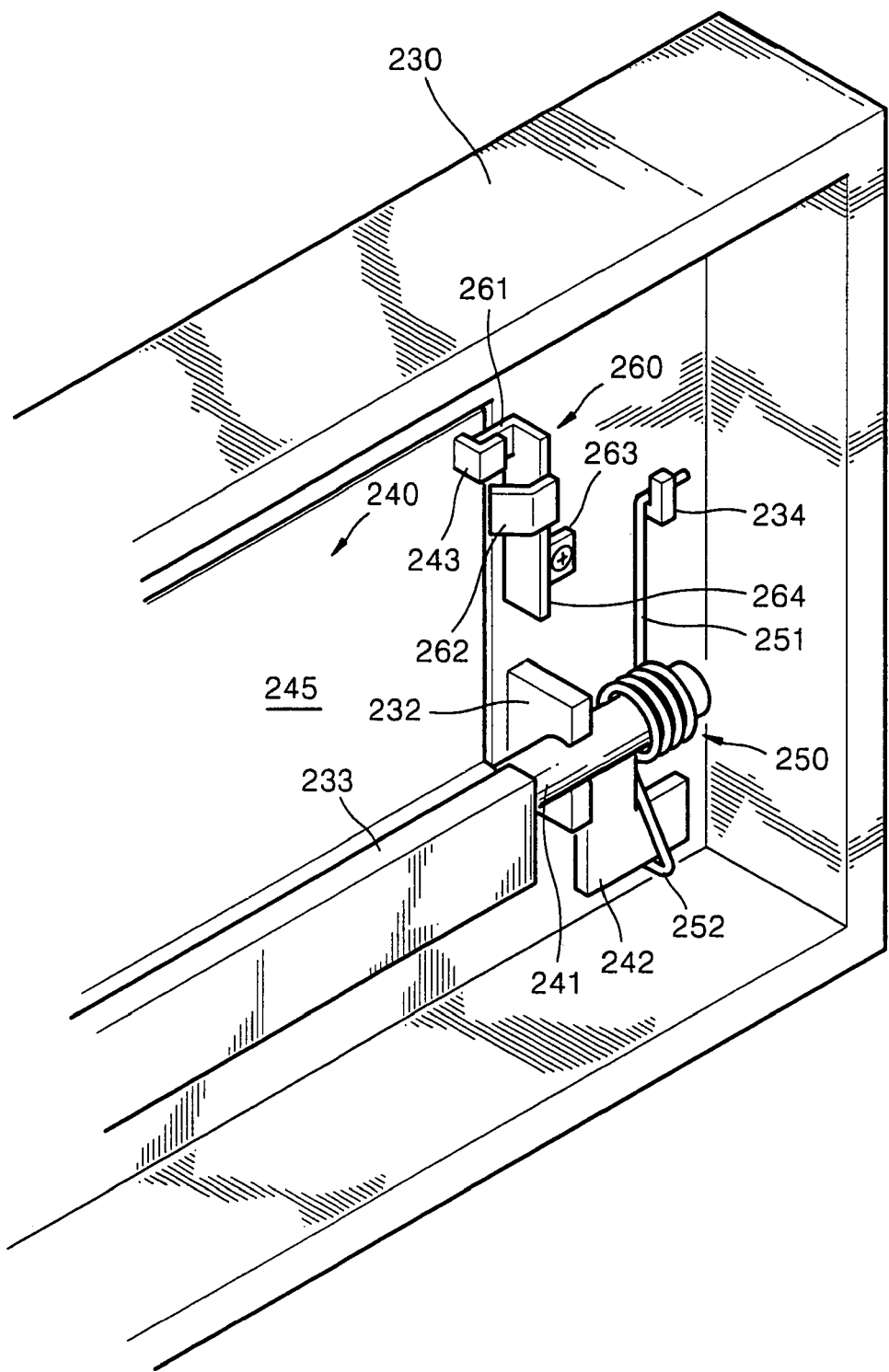
FIG. 4 is a rear perspective view of the front panel assembly of FIG. 3.

FIG. 3 shows an embodiment of a disk drive according to the present invention, and FIG. 4 is a rear perspective view of a front panel assembly of FIG. 3. Referring to FIGS. 3 and 4, there is shown a body 210 of a disk drive and a front panel assembly 200 that is mounted in front of the body 210.

The body 210 includes a spindle motor 211, a pickup unit 215, and a tray 220. The spindle motor 211 rotates a disk 280, and has a shaft with which a turntable 212 for accommodating the disk 280 is engaged. The pickup unit 215 moves in a radial direction of the disk 280 while the disk 280 is rotating, to read and/or write information on and from a recording area of the disk 280. The tray 220 has a container 221 for accommodating the disk 280. The tray 220 is assembled with the body 210 and slides in and out of the body 210 in the directions of arrows F and G in FIG. 3. According to one aspect, the spindle motor 211 and the pickup unit 215 are included in the tray 220.

The front panel assembly 200 has a front panel 230, a door 240, a torsion spring 250, and a locking lever 260. The front panel 230 includes an entrance 231 having a longitudinal opening, a rear side 235 having a pair of support members 232 with which hinge members 241 of the door 240 are engaged, and a second support member 233. Additionally, the front panel 230 has a fixing member 234 with which a first arm 251 of the torsion spring 250 is engaged, and a boss member 236 with which the locking lever 260 is engaged.

The entrance 231 has a longitudinal opening through which the tray 220 slides. The first support members 232 are provided at the left and right sides of the entrance 231 to support the hinge members 241 provided at the left and right sides of the door 240. The second support member 233, that projects inward from the rear side 235 of the front panel 230 and extends longitudinally, is provided at the lower side of the entrance 231.

The door 240 closes the entrance 231, so that the inside of the disk drive is not visible from outside. The door 240 also functions to protect a user from any piece of a broken disk 280, as will be explained below. Referring to FIG. 3, the door 240 includes a lid 244 for closing the entrance 231, a pair of hinge members 241, a limit member 242, and a hook member 243. The hinge members 241, having a cylindrical shape, are provided at the left and right ends of the lid 244. One of the hinge members 241, e.g., the right hinge member as shown in FIG. 3, has a limit member 242 that extends downward. After the door 240 closes, the limit member 242 contacts the rear side 235 of the front panel 230, and prevents the door 240 from excessively rotating in the direction of closing the entrance 231.

According to one aspect, the hook member 243 is provided at one corner, e.g., an upper-right corner as shown in FIG. 3, of the lid 244. The hook member 243 projects from the rear side of the lid 244, and is bent toward an adjacent side edge of the lid 244. The hook member 243 engages a projection member 261 of the locking lever 260 while the tray 220 is in a retracted state, as shown in FIG. 4.

According to another aspect, the hook member 243 is provided on the rear side 235 of the front panel 230, and the locking lever 260 is provided on a rear side 245 of the door 240.

The torsion spring 250 provides an elastic force to the door 240 so that the door 240 rotates in the direction of closing the entrance 231. The torsion spring 250 has the first arm 251 that engages the fixing member 234 that is provided on the rear side 235 of the front panel 230, a second arm 252 that engages the limit member 242, and a coil portion 253 set around the hinge member 241 with the limit member 242, i.e., the right hinge member 241 in FIG. 3. While the torsion spring 250 is used in the present embodiment herein described, the present invention is not limited to use of such a torsion spring. It will be understood by those of ordinary skill in the art that any kind or type of elastic members may be used alternatively. Further, while the torsion spring 250 is used only with respect to one of the hinge members 241 in the present embodiment, an additional torsion spring may be used with respect to another one of the hinge members 241.

The locking lever 260 has, in addition to the above mentioned projection member 261, a contact member 262, a joint member 263, and an elastic member 264, wherein each of the members 261 through 263 is formed integrally with, and extended from the elastic member 264. According to one aspect, the locking lever 260 is made of a single piece of metal spring material by cutting and bending such metal piece to form each of the members 261 through 264. According to another aspect, a material other than metal with adequate elasticity is used.

The projection member 261, that engages the hook member 243 of the door 240, extends from the elastic member 264, and is bent toward the hook member 243. The elastic member 264 and the projection member 261 form a locking member that prevents the door 240 from opening while the tray 220 is in a retracted state. The contact member 262 extends from the elastic member 264, and is bent to have a predetermined slope. The contact member 262 extends beyond the width of the tray 220, to interfere with the sliding of the tray 220. The contact member 262 is positioned to contact the tray 220 before the tray 20 contacts the rear side 245 of the door 240. Further, the position and the length of the projection member 261 are determined by the extent to which the projection member 261 is released from the hook member 243 by the deformation of the elastic member 264 at the time when the tray contacts the contact member 262 and reaches the rear side 245 of the door 240.

The locking lever 260 is assembled with the front panel 230 by securing the joint member 263 to the boss member 236 with a bolt 270. It will be understood that there may be various methods for assembling the locking lever 260 other than with a bolt. According to one aspect, the locking lever 260 is provided on both sides of the door 231 and, in such a case, the hook member 243 is provided on both sides of the rear side 245 of the door 240.

A process for assembling the disk drive according to an embodiment of the present invention will be described below.

First of all, the door 240 is assembled with the front panel 230 by inserting the hinge members 241 into the support members 232 and 233. Then, the door 240 can be rotated with respect to the hinge members 241 in the directions of arrows J and K in FIG. 3. Thereafter, the coil portion 253 of the torsion spring 250 is set around one of the hinge members 241, and the first and the second arms 251 and 252 are engaged with the fixing member 234 and the limit member 242, respectively. Then, the door 240 receives an elastic force by the torsion spring 250 in the direction of the arrow J. But when the door 240 completely covers or closes the entrance 231, the limit member 242 contacts the rear side 235 of the front panel 230 and, accordingly, the door 240 is closed without any further rotation. Thereafter, the locking lever 260 is assembled with the rear side 253 of the front panel 230 by pushing the projection member 261 into the hook member 243, putting the joint member 263 on the boss member 236, and securing the joint member 263 with the bolt 270. Then, the assembly of the front panel assembly 200 is completed. Thereafter, the front panel assembly 200 is mounted in front of the body 210 in which the spindle motor 211, the pickup unit 215 and the tray 220 have been installed. Thus, the assembly of the disk drive is completed.

Figure 5:
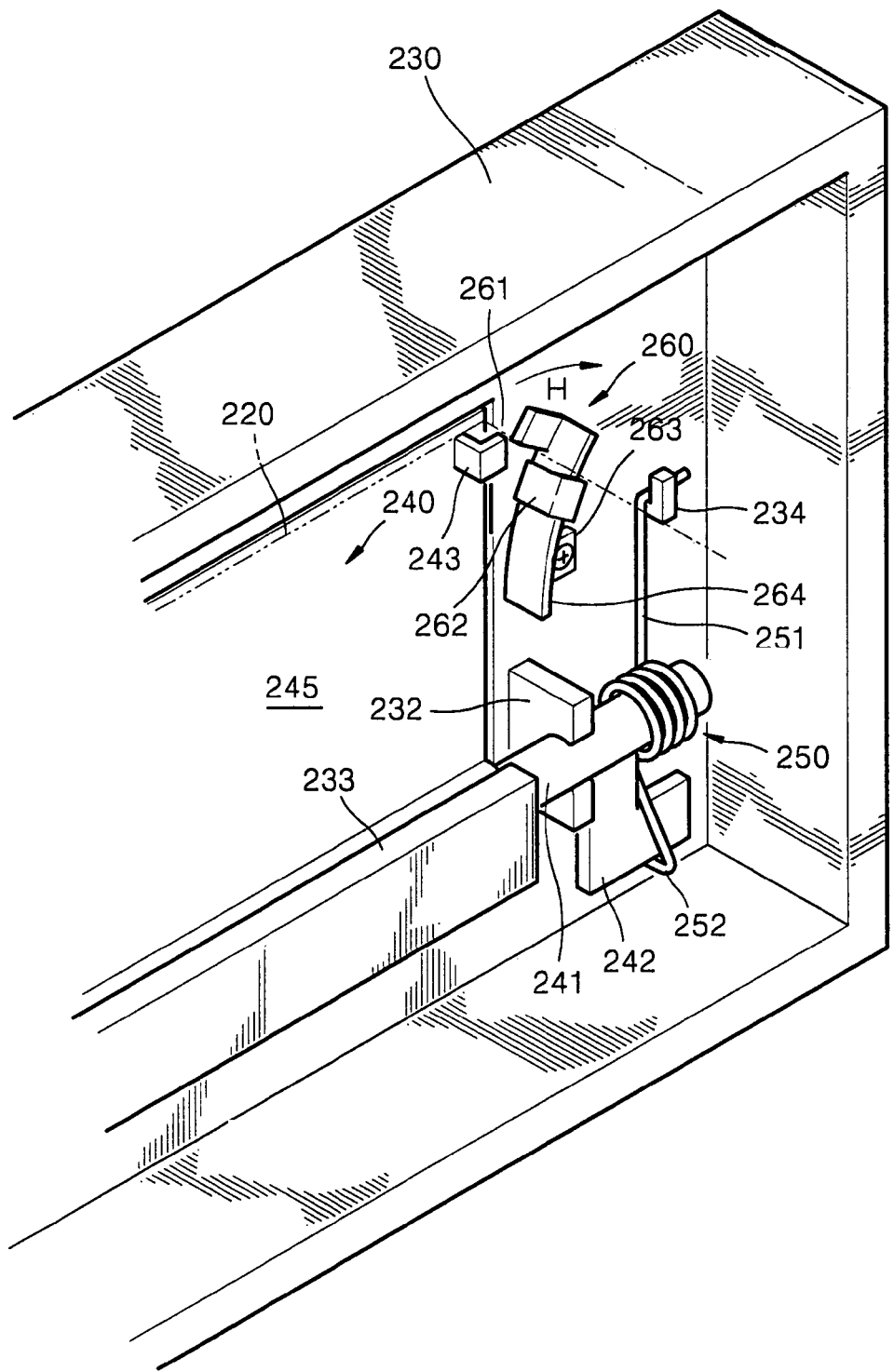
FIG. 5 is a rear perspective view of the front panel assembly of FIG. 3 for illustrating an unloading operation of a tray.

Now, operations and effects of an embodiment of the present invention having the structure shown in FIG. 3, will be described with reference to FIGS. 4 and 5.

While the tray 220 is in a retracted state, the door 240 is closed to cover the entrance 240 as shown in FIG. 4. At this moment, the door 240 is kept closed by the engagement of the projection member 261 with the hook member 243 and the elastic force of the torsion spring 250.

When the tray 220 is extending, and slides out in the direction of the arrow F (see FIG. 3), a side portion of the tray 220 contacts the contact member 262 of the locking lever 260. While the tray 220 continues the extending operation, the elastic member 264 is elastically deformed in the direction of the arrow H, and the projection member 261 is released from the hook member 243. Thereafter, a front side 222 of the tray 220 pushes the rear side 245 of the door 240 to rotate the door 240, and the tray 220 keeps sliding out to complete the extending operation.

The tray 220 retracts, after the disk 280 is accommodated thereon, by sliding in the direction of the arrow G (see FIG. 3) When the front side 222 of the tray 220 no longer contacts the rear side 245 of the door 240, the limit member 242 contacts the rear side 230 of the front panel 235 and completely closes the door 240 due to the elastic force of the torsion spring 250. As retracting of the tray 220 continues, once the tray 220 no longer contacts the contact member 262, the projection member 261 engages with the hook member 243 due to the recovery of the elastic member 264 and, then, the door 240 is secured.

According to the present invention, since the door 240 is kept closed while the tray 220 is in a retracted state, any broken piece of the disk 280 is prevented from flying out of the door 240 in the event that the disk 280 is accidentally broken while the disk 280 is rotating at a high speed. Therefore, a safer disk drive can be implemented, by which a user is largely protected from harm.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A front panel assembly mounted on a body of a disk drive for reading and writing information by accessing a disk, comprising:
    a front panel having an entrance through which a tray for accommodating the disk extends and retracts;
    a door that is rotationally assembled with the front panel to open and close the entrance in connection with extension and retraction of the tray;
    an elastic member that provides an elastic force to the door in the direction of closing the entrance; and
    a door locking apparatus that selectively allows and prevents the rotation of the door in connection with the extension and retraction of the tray.

2. The front panel assembly according to claim 1, wherein the door locking apparatus comprises:
    a hook member provided on a first side of the door; and
    a locking lever mounted on the front panel, which includes
        an elastically deformable locking member that engages the hook member to prevent the door from opening while the tray is in a retracted state, and
        a contact member that when contacted by the tray during extension and retraction of the tray, causes the locking member to elastically deform so that the locking member is released from the hook member.

3. The front panel assembly according to claim 2, wherein the door locking apparatus is provided at opposite sides of the entrance.

4. A disk drive having a body, including a spindle motor for rotating a disk, a pickup unit for accessing the disk, and a tray for accommodating the disk, which is retracted in or extended from the body, and a front panel assembly mounted on the body, which allows the tray to retract and extend, wherein the front panel assembly comprises:
    a front panel having an entrance through which the tray extends and retracts;
    a door that is rotationally assembled with the front panel to open and close the entrance in connection with extension and retraction of the tray;
    an elastic member that provides an elastic force to the door in the direction of closing the entrance; and
    a door locking apparatus that selectively allows and prevents the rotation of the door in connection with the extension and retraction of the tray.

5. The disk drive according to claim 4, wherein the door locking apparatus comprises:
    a hook member provided on a first side of the door; and
    a locking lever mounted on the front panel, which includes
        an elastically deformable locking member that engages the hook member to prevent the door from opening while the tray is in a retracted state, and
        a contact member that, when contacted by the tray during extension and retraction of the tray, causes the locking member to elastically deform so that the locking member is released from the hook member.

6. The disk drive according to claim 5, wherein the door locking apparatus is provided at opposite sides of the entrance.

7. A front panel assembly of a disk drive including a body, and a tray that retracts into and extends from the body and accommodates a disk, the front panel assembly comprising:
- a front panel that is combined with the body, and has an entrance through which the tray extends and retracts;
- a door combined with the front panel to open and close the entrance in connection with extension and retraction of the tray;
- an elastic member that biases the door in a closing direction; and
- a door locking apparatus that selectively allows and prevents the opening of the door in connection with extension and retraction of the tray.

8. The front panel assembly according to claim 7, wherein the door locking apparatus comprises:
- a hook member provided on a first side of the door; and
- a locking lever provided on the front panel that engages the hook member when the tray is retracted, and elastically deforms and disengages from the hook member when contacted by the tray as the tray extends.

9. The front panel assembly according to claim 8, wherein the locking lever comprises:
- an elastic member that engages the hook member; and
- a contact member,
- wherein when the tray extends, the tray contacts the contact member and elastically deforms the elastic member to disengage the elastic member from the hook member.

10. The front panel assembly according to claim 9, wherein the elastic member comprises:
- a projection member that engages the hook member.

11. The front panel assembly according to claim 10, wherein the locking lever further comprises:
- a joint member, to combine the locking lever to the front panel,
- wherein the joint member, the projection member, the contact member, and the elastic member are integrally formed.

12. The front panel assembly according to claim 11, wherein:
- the joint member, the projection member, the contact member, and the elastic member are made of a single piece of elastic material.

13. The front panel assembly according to claim 12, wherein:
- the elastic material is spring metal.

14. The front panel assembly according to claim 7, wherein:
- a plurality of the door locking apparatuses are provided on the front panel.

15. The front panel assembly according to claim 7, the door comprises:
- a limit member that engages the front panel when the door is closed and prevents the door from moving further in the closing direction.

16. The front panel assembly according to claim 7, wherein the door locking apparatus comprises:
- a hook member provided on the front panel; and
- a locking lever provided on a first side of the door that engages the hook member when the tray is retracted, and elastically deforms and disengages from the hook member when contacted by the tray as the tray extends.

* * * * *